Nov. 3, 1931.  E. E. WEMP  1,830,306
AUTOMATIC LASH COMPENSATING DEVICE FOR CLUTCHES OR THE LIKE
Filed March 3, 1930   2 Sheets-Sheet 1
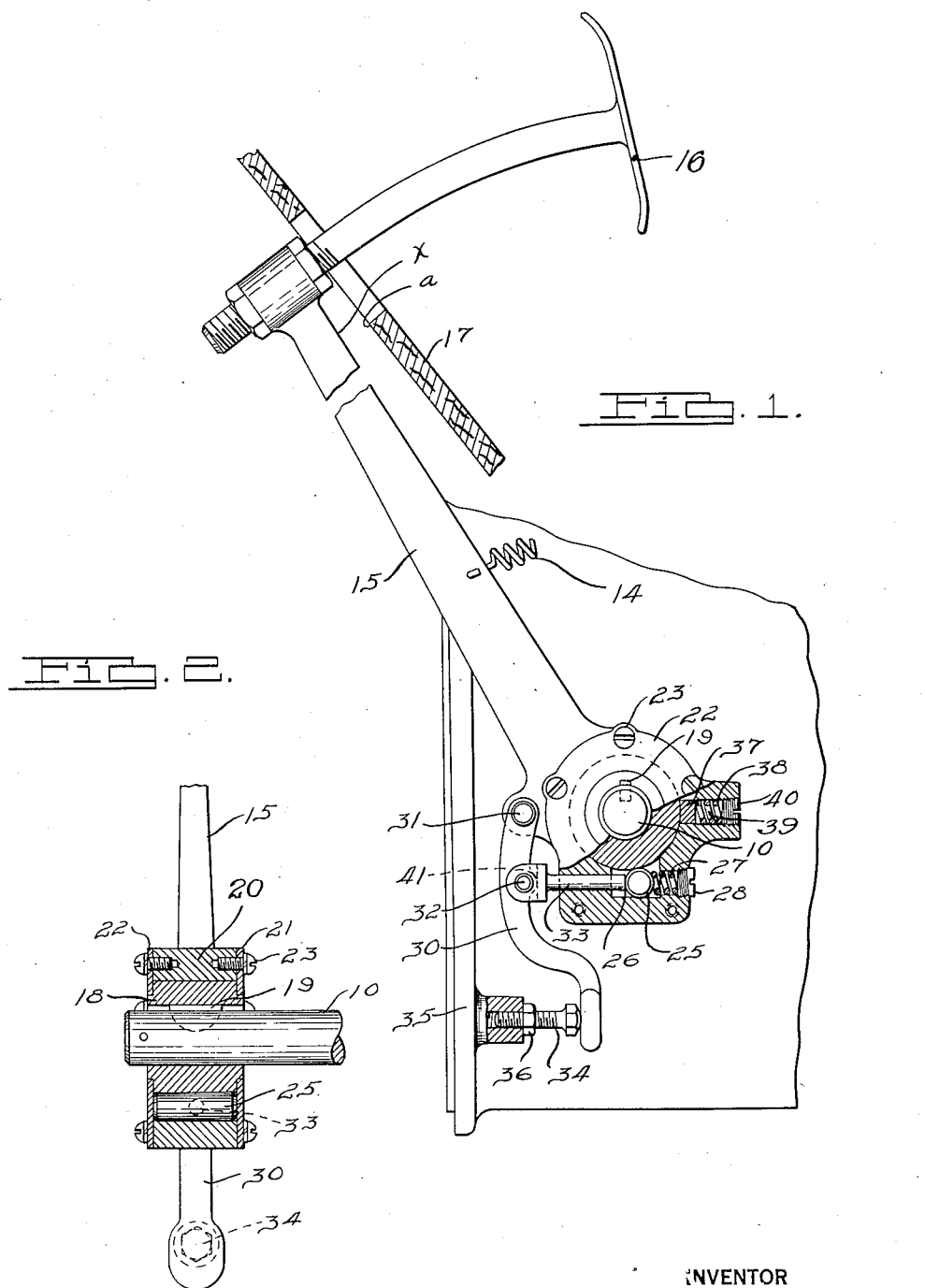
INVENTOR
Ernest E. Wemp.
BY
Stuart C. Barnes
ATTORNEY

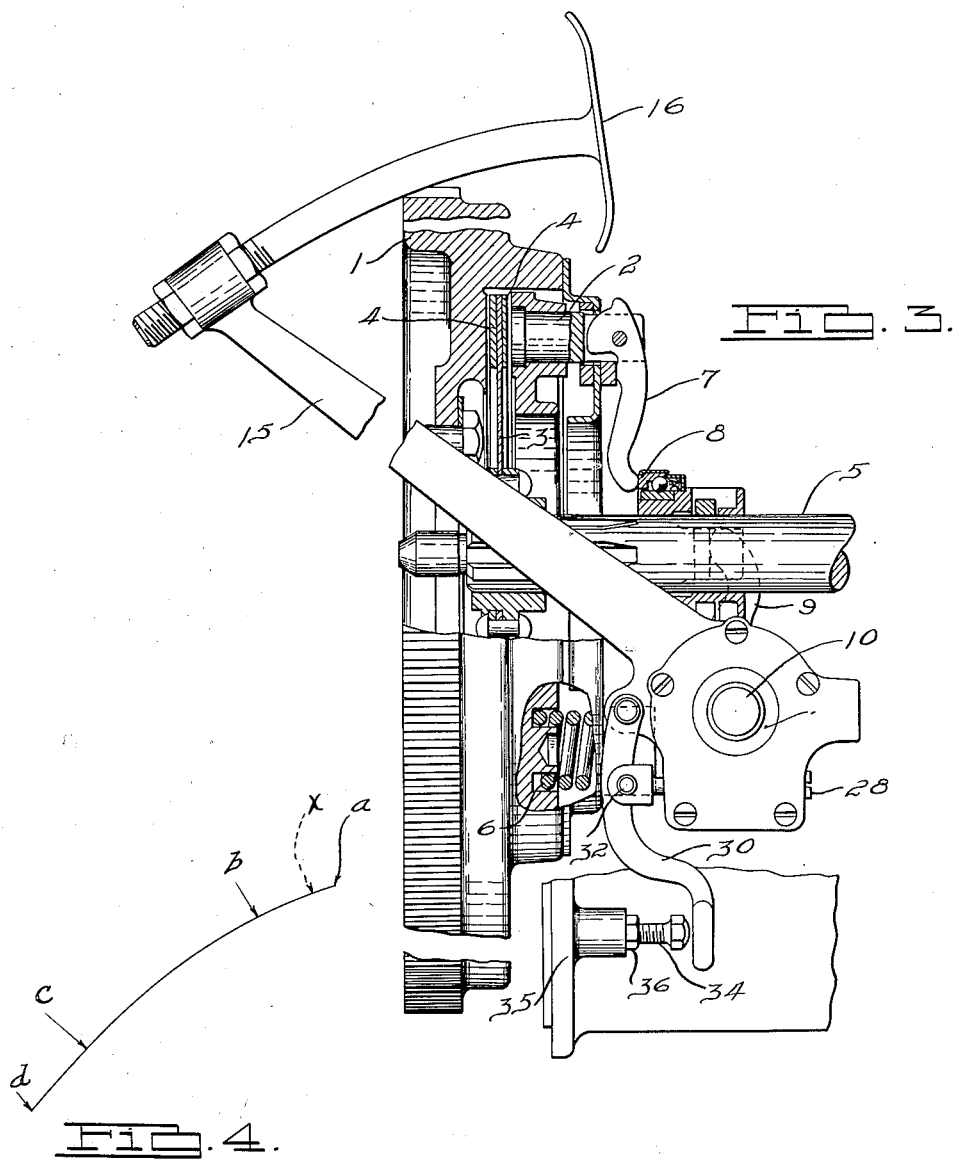

Patented Nov. 3, 1931

1,830,306

UNITED STATES PATENT OFFICE

ERNEST E. WEMP, OF DETROIT, MICHIGAN

AUTOMATIC LASH COMPENSATING DEVICE FOR CLUTCHES OR THE LIKE

Application filed March 3, 1930. Serial No. 432,724.

The clutch and operating mechanism therefor as used in automotive vehicles forms the subject matter with which the present invention is concerned.

In clutches of the type alluded to, as most generally used today, there is employed facing material, or what may be termed friction material, which is alternately frictionally engaged and released to establish the driving connection and to break the driving connection respectively. The friction material is usually on a driven member of the clutch and is engaged by the members. In use, the friction material becomes worn with the result that the position of the movable packing member of the clutch, or pressure ring, changes with respect to the associated parts because, as the friction material becomes thinner then the pressure member must move closer to the opposing driving member. This results in a change in the position of the outside operable member which is usually in the form of a lever actuated by the foot of the operator.

As is well understood, the clutch pedal is mounted usually below the floor boards; it is depressed to release the clutch and allowed to move back from the depressed position to again engage the clutch. Accordingly, to let the clutch fully engage, the pedal must have free movement, and in this regard the original set-up provides for a suitable clearance, normally termed "lash", so that the clutch becomes fully engaged before the pedal moves back against the toe boards. As the clutch facings wear, however, the point of full clutch engagement moves toward the toe boards with the result that the lash is decreased, and ultimately, with sufficient wear of the clutch facings, the pedal will strike the toe boards before the clutch is fully engaged. Thus, the clutch packing springs are restrained by the pedal striking the toe boards, and their full power is not exerted on the clutch pressure ring, with the result that there is clutch slippage. This condition causes rapid wearing of the clutch facing material and ofttimes is not noted or corrected before the clutch facings are worn beyond repair. This is the cause of much clutch trouble.

The present invention is directed towards the provision of what may be termed an automatic lash compensator. In accordance with the invention the clutch lever, or pedal, may be given an initial set, having requisite clearance in its path of movement between the toe boards and the point where the clutch starts to be disengaged, and this initial set-up will be maintained indefinitely. To accomplish this, suitable compensating means are provided between the clutch pedal or lever, and the part which acts relatively directly upon the clutch to release it against the packing springs. This compensating means is arranged to permit the part which operates relatively to the clutch pedal so that as the clutching facings become worn this operating part may change the position it assumes in full clutch engagement, but this change does not take place in the pedal because of the relative movement which is permitted by the compensating means, between the pedal and the part which operates relatively directly upon the clutch.

The invention will be better understood as the following detailed description is read in connection with the accompanying drawings. In these drawings:

Fig. 1 is a side elevational view of a clutch pedal mounted directly upon a clutch operating rocker shaft and illustrating the means establishing a connection between the pedal and rocker shaft for compensating for the lash.

Fig. 2 is a section taken through the rock shaft and lever connection.

Fig. 3 is a view illustrating a more or less conventional type of clutch showing the operating rock shaft and lever.

Fig. 4 is a diagrammatic view in illustration of the path of movement of the engaged part of the pedal or clutch releasing lever, or the point of power application by the operator.

It, of course, is to be understood that the details of the clutch construction may vary considerably, but for the purpose of disclosure a clutch is shown in Fig. 3 which embodies usual clutch features. A fly wheel is illustrated at 1, a pressure plate or ring at 2; the fly wheel and pressure plate serve as driving members and rotate together. A driven disk is at 3 having clutch facings 4. The driven disk is mounted upon the driven shaft 5. The pressure ring, under action of springs 6, packs the friction material of the driven disk between itself and the fly wheel. Clutch releasing levers 7 are provided which are moved by suitable means, as for example, a collar 8, which in turn may be moved by a yoke 9 mounted upon rock shaft 10. The above structure embodies a clutch construction suitable for the present disclosure, although as above stated, the details may vary to a considerable extent.

For the purpose of rocking shaft 10 to effect clutch operation, there is provided a clutch lever 15 having the usual pedal 16, and it is mounted underneath the toe boards of the automobile which are illustrated at 17, acted upon by spring 14. There is a sleeve 18 mounted directly upon the shaft 10 and keyed thereto, as at 19. The end of the arm 15 is of suitable proportions, as shown at 20, for fitting over the sleeve 18. The parts may be held assembled by side plates 21 and 22 held by suitable screws 23. Preferably these side plates have their inner edges spaced from the shaft 10 so as to clear the keyway thus permitting the arm and sleeve to be first assembled as a unit and then mounted on the shaft.

The arm 15 is mounted on the sleeve 18 so that the two may have relative rotation, but this relative movement is prevented when it is desired to operate the clutch by depressing the pedal. This is accomplished by means of a clutch, which in the present instance, takes the form of a roller 25 mounted in a recess or cavity 26 provided in the body of the base of the lever 15. This roller is acted upon by a spring 27, backed by a plug 28. By reference to Fig. 1 it will be noted that the spring tends to urge the roller from right to left, thus binding it, or rather jamming it, between the peripheral surface of the sleeve 18 and the opposing wall of the recess 26. Carried by the arm 15 is a control member 30 which hangs from a pivotal connection 31 and which is pivotally connected, as at 32, to a plunger 33 which extends into the cavity 26 and which is designed to contact with the roller 25. The pivotal connection 32 is rather loose, as by means of placing a pin through an aperture which has an inside diameter greater than that of the pin to permit of the plunger 33 moving reciprocably in a straight line while the pin carried by control member 30 swings in an arc. The control member 30 may have a raised portion 41 which makes contact directly with the plunger 33 so that pressure may be applied to the plunger irrespective of the loose connection at 32. A stop 34 is carried by any fixed part suitable for the purpose, as for example, a part of the stationary clutch housing as illustrated at 35. and this stop may be an ordinary screw held in adjusted position by a nut 36.

Also there is preferably provided means tending to effect a resistance to relative movement between the bearing portion 20 of the clutch pedal and the sleeve 18, and this means advantageously takes the form of a member 37 disposed in a recess 38, and held in frictional engagement with the sleeve by a spring 39 backed by a plug 40. The member 37 may be, and preferably is, of suitable friction or facing material, and in this regard it may be of a fiber or a material similar to that employed for the clutch facings.

For the purpose of explaining the operation of the mechanism reference will be made to the diagrammatic showing of Fig. 4 wherein there is shown the arc of travel of a clutch pedal. In the ordinary clutch, the pedal during clutch engagement is held at the end of its stroke, illustrated by $a$; when it is depressed the clutch does not start to become disengaged until the pedal reaches $b$; the clutch disengagement movement takes place from point $b$ to point $c$, and from point $c$ to $d$ there is usually an extra movement of the pedal which may or may not be used in its entirety by different operators but which is desirable in a commercial set up. The movement from $a$ to $b$ is practically wasted but is necessary, because in clutches heretofore used, the point $b$ gradually moves towards the point $a$ where the pedal abuts up against something which usually is the toe boards. When this occurs the clutch is not fully engaged resulting in damage above mentioned.

The distance from $a$ to $b$ is commonly known as the "lash", and with the present structure just described this lash may be materially reduced, as the point $b$, which is the point of full clutch engagement, may be initially placed at $x$. To determine this location the stop 34 is adjusted, as will be understood as the following operation is brought out. Assume now that the lever 15 is retracted against the toe boards and abuts against point $a$, the pedal when depressed moves to point $x$, and at about this time the control member 30 leaves the stop 34, or in any event, there is sufficient relief to permit plunger 33 to move from right to left so that the spring 27 acts upon roller 25, jams it between the sleeve and lever housing so that the sleeve and lever are clutched together. Continued movement disengages the clutch because the shaft 10 is now rocked, and this continues, referring back to Fig. 4, to the point $c$ where the clutch is fully disengaged, and additional movement, depending upon the operator, may now be made as far as point $d$. To engage the clutch the lever is allowed to take a reverse movement, and the clutch is fully engaged at the point $x$. At this time, control member 30 strikes the stop 34, urges the plunger 33 in against the roller 25, slightly compresses spring 27 so that the lever is declutched from the sleeve 18. The spring acting upon the clutch pedal draws the same back to point $a$, but there is no effect on sleeve 18.

Now assume that in letting the clutch in considerable wear of the clutch facings took place so that when the lever retracted to point $x$ the packing springs in the clutch were as yet not fully expanded; the clutch member 25 is nevertheless released at point $x$ with the pedal stopping at point $a$, but the clutch springs may push the pressure ring 2 farther inwardly against the clutch facing material causing, essentially, rotation of the shaft 10 clockwise as Fig. 1 is viewed. During this time the sleeve 18 rotates in the bearing portion of the lever against the action of the facing material 37. This facing material prevents any undue relative rotation but permits rotation as above described. When the clutch is again released by the pressing of the pedal the same cycle is repeated but the roller clutch 25 picks up the sleeve 18 at a different point. Obviously the relative rotation between sleeve 18 and the lever at any one time is minute, and indeed, is not great over a long period of time but is more or less of a progressive adjustment which automatically takes place as the clutch facings wear away.

Accordingly, it will be noted that in initial set up, the stop 34 may be adjusted to release clutch 25 at the desired point, as for example point $x$, leaving a small lash from $a$ to $x$ and this setting will be maintained throughout the life of the car. A particular advantage, in addition to the automatic lash compensating arrangement, is that lash movement, or the useless movement of the clutch pedal, is reduced to a minimum thus increasing the useful part of the stroke of the clutch pedal in releasing the clutch; the increase is represented in Fig. 4 wherein the useful stroke is from $x$ to $c$ as distinguished from $b$ to $c$. However, it is of prime importance that the point $x$ remain constant. This increase in the useful travel of the lever makes possible a lower clutch pedal pressure so that it is easier to operate, or conversely, stronger clutch packing springs may be utilized with the same clutch pedal pressure.

The sleeve 18, roller 25 and the face of the cavity 26 engaged by the roller 25 are preferably hardened. In assembling the parts, suitable lubricant is preferably included, which is retained by the side plates 21 and 22. As shown herein, the clutch pedal or manually operable part is mounted directly upon the clutch operating part or shaft 10. This is but one manner of connecting a lever with the rock shaft.

It has been pointed out that the toe boards form the stop for limiting the movement of the clutch pedal in one direction; this is the usual practice in many automobiles of today, but it is within the invention to provide any other stopping means in place of the toe boards. Also, while the invention is directed particularly to the overcoming of problems existing in automotive vehicle clutches and operating parts, the invention is not so limited but is useful wherever similar conditions arise. In some of the claims appended hereto use of the term "at rest" position is made. In construing the claims this is to mean that the clutch is engaged and the operating parts are in the position which they normally assume in clutch engagement.

Claims:

1. The combination with a clutch having friction material subject to wear, a rock shaft for operating the clutch, a lever for actuating the rock shaft, clutch means connecting the lever and rock shaft, and means for releasing said last named clutch means substantially upon engagement of said clutch to permit rock shaft movement independent of the lever.

2. The combination in an automotive vehicle of a power transmitting clutch, a rock shaft for actuating the same, a lever for rocking the shaft, means limiting the movement of the lever in clutch engaging movement, and means for releasing the connection between the lever and shaft before the lever reaches said movement-limiting means, whereby the rock shaft may have rotatable movement independently of movement of the lever to compensate for wear of the clutch facing.

3. The combination in an automotive vehicle of a power transmitting clutch, a rock shaft for actuating the same, a lever for rocking the shaft, means limiting the movement of the lever in clutch engaging movement, means for releasing the connection between the lever and shaft before the lever reaches said movement-limiting means, whereby the rock shaft may have rotatable movement independently of movement of the lever to compensate for wear of the clutch facing, and means for adjusting said releasing means between lever and shaft to determine said releasing action with respect to the travel of the lever.

4. The combination with a clutch in an automotive vehicle subject to varied positions of engagement due to wear, a rock shaft for actuating the same, a lever for rocking the shaft, clutching means establishing an operative connection between the lever and shaft, and means for automatically disengaging said clutch means substantially at the time of full engagement of the automotive vehicle clutch.

5. The combination with a clutch in an automotive vehicle, a rock shaft for actuating the same, a lever for rocking the shaft, clutching means establishing an operative connection between the lever and shaft, and means for disengaging said clutch means substantially at the time of full engagement of the automotive vehicle clutch, whereby the rock shaft may adjust itself with respect to said lever as the facing materials of the automotive vehicle clutch wear away.

6. The combination with a clutch in an automotive vehicle, means for actuating the clutch, controlling means for the actuating means, a clutching device establishing a connection between the control means and actuating means, means for holding the clutching device released when the automotive vehicle clutch is engaged, means for engaging the clutching device upon initial movement of the controlling means for releasing the automotive vehicle clutch, said clutching device remaining engaged during disengagement of the automobile clutch, and said releasing means effecting disengagement of the clutching device substantially as the automotive vehicle clutch is engaged by movement of the controlling means.

7. A mechanism for operating a clutch or the like, comprising a shaft, a sleeve keyed to the shaft, operating means having a bearing like formation fitting over the sleeve, clutching means for establishing a driving connection between the sleeve and operating means, and means for releasing the clutching means, said last named means being adjusted to release the clutching means at a predetermined position in the path of movement of the operating means.

8. A mechanism for operating a clutch or the like, comprising a rock shaft, movable controlling means associated with the rock shaft, a clutch establishing a connection between the rock shaft and the controlling means, means associated with a relatively fixed adjacent portion for releasing the clutch when the movable controlling means assumes a predetermined position, and friction means resisting relative movement between the rock shaft and controlling means.

9. A mechanism for operating a clutch or the like, comprising a rock shaft, movable controlling means associated with the rock shaft, a clutch means establishing a connection between the rock shaft and the controlling means, means associated with a relatively fixed adjacent portion for releasing the clutch when the movable controlling means assumes a predetermined position, and friction means resisting relative movement between the rock shaft and controlling means, said friction means preventing abnormal relative movements between the rock shaft and controlling means but permitting the rock shaft to adjust itself with respect to the controlling means when the said clutch means is released.

10. A mechanism for controlling a clutch or the like, comprising a rock shaft, a sleeve keyed to the rock shaft, a lever having a portion journaled on the sleeve, a socket in said portion of the lever, a clutch element therein, spring means for jamming the clutch element between a wall of the socket and the sleeve to clutch the lever and sleeve together, a plunger extending into the socket, means for actuating the plunger against the spring pressed clutch element to release the clutch, and adjustable means for determining the action of the plunger.

11. A mechanism for controlling a clutch or the like, comprising a rock shaft, a sleeve keyed to the rock shaft, a lever having a portion journaled on the sleeve, a socket in said portion of the lever, a clutch element therein, spring means for jamming the clutch element between a wall of the socket and the sleeve to clutch the lever and sleeve together, a plunger extending into the socket, means for actuating the plunger against the spring pressed clutch element to release the clutch, adjustable means for determining the action of the plunger, and friction means setting up a friction between the lever and sleeve to resist relative movement but permitting the rock shaft to rotatably adjust itself with respect to the lever.

12. The combination with a clutch in an automotive vehicle, a rock shaft for controlling engagement and disengagement of the clutch, a lever journaled on the rock shaft, means constituting a one-way drive connection between the lever and rock shaft whereby movement of the lever in one direction rocks the shaft and wherein movement of the lever in reverse direction is ineffective for rocking the shaft, means for retracting the lever in its ineffective movement, a stop against which the lever is adapted to be retracted, a link pivotally connected to the lever eccentrically of the rock shaft, a plunger pivotally associated with the link having an end associated with the one-way drive means, and a fixed stop for engaging the link as the lever is retracted for rocking the same on its pivotal connection with the lever to actuate the plunger and release the one-way drive connection.

13. The combination with a clutch, a control member operable for clutch engagement and release, a second member associated with the clutch, means for establishing an operable connection between the control member and the second member, means rendering the connecting means normally ineffective in clutch engaged position whereby the members may shift relative to each other to compensate for clutch wear, said last mentioned means being rendered ineffective when the control member is actuated for clutch release.

14. The combination with a clutch, of means for controlling release and engagement of the clutch comprising a manually movable member, and a member associated with the clutch, said members being normally disassociated in clutch engaged position whereby they may move relative to each other to compensate for clutch wear, and means effective only when the manually controlled member is actuated for clutch release establishing an operable connection between said two members.

15. Means for controlling the release and engagement of a clutch, comprising a manually operable member and a member associated with the clutch, means for establishing an operable connection between said two members, means for rendering the connection-establishing means in effective clutch-engaged position whereby the two members may shift relative to each other to compensate for clutch wear, said last named means being rendered ineffective when the manually controlled means is actuated for clutch release.

In testimony whereof I affix my signature.

ERNEST E. WEMP.